US010422961B2

(12) United States Patent
Logunov et al.

(10) Patent No.: US 10,422,961 B2
(45) Date of Patent: Sep. 24, 2019

(54) FIBER ARRAY FORMED USING LASER BONDED OPTICAL FIBERS

(71) Applicant: CORNING INCORPORATED, Corning, NY (US)

(72) Inventors: Stephan Lvovich Logunov, Corning, NY (US); Mark Alejandro Quesada, Horseheads, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/157,844

(22) Filed: Oct. 11, 2018

(65) Prior Publication Data
US 2019/0250337 A1 Aug. 15, 2019

Related U.S. Application Data

(63) Continuation of application No. 15/897,823, filed on Feb. 15, 2018.

(51) Int. Cl.
*G02B 6/38* (2006.01)
*G02B 6/36* (2006.01)
(Continued)

(52) U.S. Cl.
CPC ............. *G02B 6/3636* (2013.01); *G02B 6/30* (2013.01); *G02B 6/3861* (2013.01); *G02B 6/4212* (2013.01); *G02B 6/4238* (2013.01)

(58) Field of Classification Search
CPC ........ G02B 6/02209; G02B 6/30; G02B 6/32; G02B 6/3636; G02B 6/3861; G02B 6/4212; G02B 6/4238
See application file for complete search history.

(56) References Cited

U.S. PATENT DOCUMENTS 6,219,484 B1 * 4/2001 Rhee .................... G02B 6/3636
385/137
6,411,759 B1 * 6/2002 Beguin ................ G02B 6/2551
385/49
(Continued)

FOREIGN PATENT DOCUMENTS

JP 2002022995 A * 1/2002 ............... G02B 6/24

OTHER PUBLICATIONS

Butler et al; "Assembiles, Optical Connectors and Methods of Bonding Optical Fibers to Substrates"; Filed as U.S. Appl. No. 15/897,823, filed Feb. 15, 2018, 29 Pages.

*Primary Examiner* — Daniel Petkovsek
(74) *Attorney, Agent, or Firm* — Adam R. Weeks

(57) ABSTRACT

Assemblies, optical connectors, and methods for forming fiber arrays using laser bonded optical fibers are disclosed. In one embodiment, a method of forming a fiber array includes placing an optical fiber on a surface of a substrate, directing a laser beam into the optical fiber disposed on the surface of the substrate, melting, using the laser beam, a material of the substrate to create a first laser bond zone between the optical fiber and the surface of the substrate, applying an adhesive to the optical fiber and the substrate to create an adhesive bond zone between the optical fiber and the surface of the substrate, and cutting the optical fiber and the substrate to create a first section of the fiber array and a second section of the fiber array. The first section of the fiber array includes a first portion of the optical fiber, a first portion of the substrate, a first portion of the adhesive bond zone, and the first laser bond zone, and the second section of the fiber array includes a second portion of the optical fiber, a second portion of the substrate, and a second portion of the adhesive bond zone.

26 Claims, 13 Drawing Sheets

(51) Int. Cl.
  *G02B 6/30* (2006.01)
  *G02B 6/42* (2006.01)

(56) References Cited

U.S. PATENT DOCUMENTS

| | | |
|---|---|---|
| 6,440,776 B1 | 8/2002 | Musk |
| 8,873,908 B2 | 10/2014 | Hu et al. |
| 9,000,327 B2 | 4/2015 | Yoshikawa |
| 2007/0201797 A1* | 8/2007 | Grzybowski .... B29D 11/00384<br>385/52 |
| 2013/0170789 A1* | 7/2013 | Kuang ................ G02B 6/3636<br>385/14 |
| 2016/0268541 A1 | 9/2016 | Dabich, II et al. |

* cited by examiner

FIBER ARRAY FORMED USING LASER BONDED OPTICAL FIBERS

CROSS-REFERENCE TO RELATED APPLICATION

This application claims the benefit of priority of U.S. application Ser. No. 15/897,823, filed Feb. 15, 2018, the content of which is relied upon and incorporated herein by reference in its entirety.

BACKGROUND

The present disclosure generally relates to fiber arrays and, more particularly to fiber arrays formed using laser bonding of optical fibers to a flat substrate.

Benefits of optical fiber include extremely wide bandwidth and low noise operation. Because of these advantages, optical fiber is increasingly being used for a variety of applications, including, but not limited to, broadband voice, video, and data transmission. Optical fibers are often incorporated into fiber connectors having one or more fiber arrays. These types of connectors are often used in data center and telecommunication systems to provide service connections to rack-mounted equipment and to provide inter-rack connections. For example, optical connectors incorporating fiber arrays are employed in optical cable assemblies and optical devices to provide an optical-to-optical connection wherein optical signals are passed between the optical cable assembly and the optical device.

Fiber arrays used in optical connectors may include optical fibers secured within grooves of a substrate by an adhesive and a cover. Typically, the optical fibers are positioned within the grooves of the substrate and then secured in place using the adhesive and cover. The fiber array may then be incorporated in an optical device (such as an optical connector) to provide optical communication between optical devices. In one example, an optical connector incorporating a fiber array is connected to an edge of a waveguide substrate having waveguides providing opto-electronic channels. The waveguide substrate may be a component of a photonic integrated circuit assembly, for example.

In order to provide high quality signal transfer between optical connectors and optical devices, the optical fibers of the fiber array(s) of the optical connector and the optical features of the optical device must be precisely aligned. Misalignment of these elements may cause signal degradation or may prevent optical signals from passing between the optical connector and the optical device.

SUMMARY

Embodiments of the present disclosure are directed to fiber arrays formed using laser bonding of optical fibers to a flat substrate. Disclosed is a method of forming a fiber array that includes placing an optical fiber on a flat surface of a substrate or on a film layer on the surface of the substrate, directing a laser beam or multiple laser beams into the optical fiber disposed on the surface of the substrate, and melting, using the laser beam, a material of the substrate to create one or more laser bond zones between the optical fiber and the surface of the substrate. The method also includes applying an adhesive to the optical fiber and the substrate to create an adhesive bond zone between the optical fiber and the surface of the substrate. The adhesive bond zone may overlap the laser bond zone and, in some embodiments, extends beyond the laser bond zone. The method also includes cutting the optical fiber and the substrate to create a first section of the fiber array and a second section of the fiber array. The first section of the fiber array may include a first portion of the optical fiber, a first portion of the substrate, a first portion of the adhesive bond zone, and the first laser bond zone. The second section of the fiber array may include a second portion of the optical fiber, a second portion of the substrate, and a second portion of the adhesive bond zone. In some embodiments, the second section of the fiber array may be used to form an optical device, such as an optical connector.

In another embodiment, a method for forming a fiber array includes placing a plurality of optical fibers on a surface of a substrate and translating a laser beam or multiple laser beams, or the substrate, in a first direction transverse to the longitudinal axis of the plurality of optical fibers such that the laser beam passes over the plurality of optical fibers to form a laser bond zone between the plurality of optical fibers and the surface of the substrate. The method also includes applying an adhesive to the plurality of optical fibers and the substrate to create an adhesive bond zone between the plurality of optical fibers and the surface of the substrate. The method also includes cutting the optical fibers and the substrate to create a first section of the fiber array and a second section of the fiber array. The first section of the fiber array includes a first portion of each of the plurality of optical fibers, a first portion of the substrate, a first portion of the adhesive bond zone, and the laser bond zone. The second section of the fiber array includes a second portion of each of the plurality of optical fibers, a second portion of the substrate, and a second portion of the adhesive bond zone.

In yet another embodiment, the method of forming a fiber array includes using a laser beam to secure one or more optical fibers to a surface of a substrate at a laser bond zone, using an adhesive to secure the one or more optical fibers to the surface of the substrate at an adhesive bond zone, and cutting the optical fiber and the substrate to create a first section of the fiber array and a second section of the fiber array. The first section of the fiber array includes a first portion of each optical fiber, a first portion of the substrate, a first portion of the adhesive bond zone, and the first laser bond zone. The second section of the fiber array includes a second portion of each optical fiber, a second portion of the substrate, and a second portion of the adhesive bond zone.

Also disclosed is an assembly for use in an optical connector. The assembly includes a substrate having a first portion having a first surface and a second portion having a second surface. A first portion of one or more optical fibers is secured to the first surface of the first portion of the substrate at a laser bond zone and a first adhesive bond zone. The adhesive bond zone overlaps the laser bond zone. A second portion of the one or more optical fibers is secured to the second surface of the second portion of the substrate at a second adhesive bond zone. The second portion of the optical fibers includes a polished end.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Figure 1:
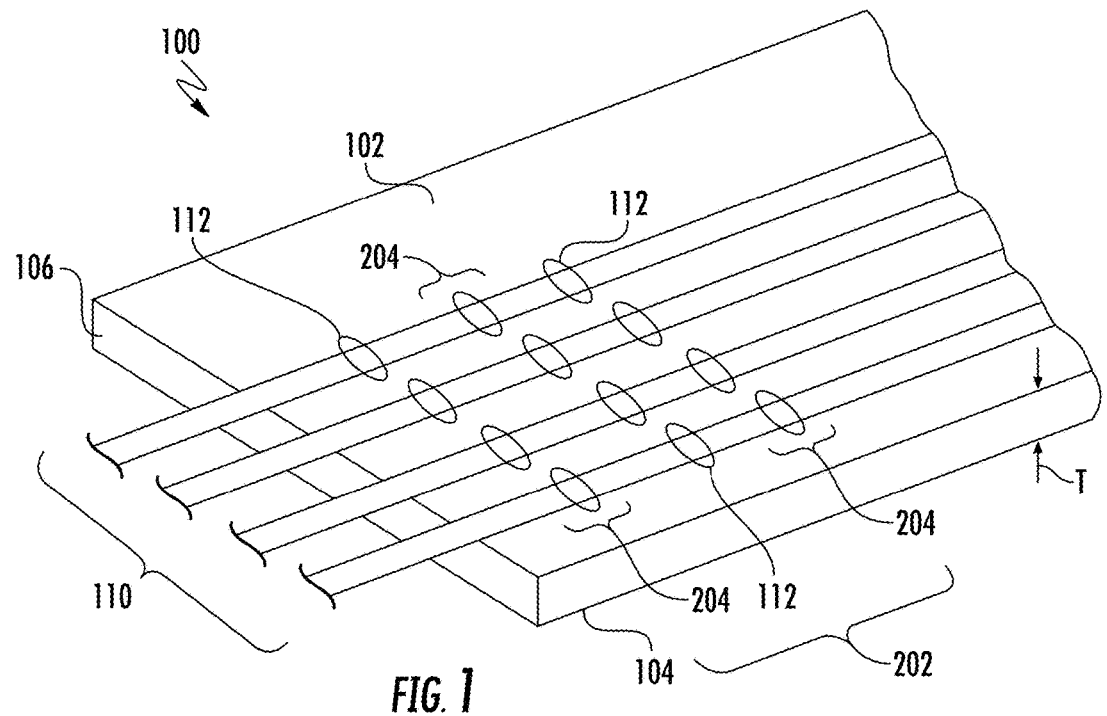
FIG. 1 schematically depicts a perspective view of an assembly comprising a plurality of optical fibers bonded to a substrate by a laser welding process according to one or more embodiments described and illustrated herein.

Embodiments described herein are directed to fiber arrays and methods for forming fiber arrays. In embodiments of the present disclosure, optical fibers, which have a curved shape, are bonded to a flat substrate using a laser beam or multiple laser beams to form laser bond zones and then further secured to the substrate using an adhesive, such as an epoxy, to form adhesive bond zones. The portions of the optical fibers in the laser bond zones are able to be precisely located and secured on the substrate but the optical fibers, the substrate, or both the optical fibers and the substrate in the laser bond zones may also have higher stress concentrations than the portions of the optical fibers and the substrate outside of the laser bond zones. To isolate the stress concentrations from the connector interface while still maintaining the precise location of the fibers, the fibers and the substrate may be cut to form two or more sections of the fiber array wherein the cut takes place in the adhesive bond zone and a specified distance away from the laser bond zone (or laser bond zones) to reduce, minimize, or eliminate stress caused by the laser bond process at the cut ends of the optical fibers. The cut ends of the optical fibers are still secured in place by the adhesive bond zones and may then be processed (e.g., polished and placed within a housing) to form an optical device such as an optical connector.

Fiber arrays formed using methods described herein may be useful in optical connectors such as those used in coupling optical cable assemblies to an edge of a waveguide substrate. In order to provide high quality signal transfer between such optical connectors and optical devices, the optical fibers of the fiber array of the optical connector and the optical features of the optical device must be precisely aligned because misalignment may cause signal degradation or may prevent optical signals from passing between the optical connector and the optical device. Securing the optical fibers to the substrate using laser beams can provide a high precision placement and alignment without the use of traditional V-groove alignment. As discussed above, the portions of the optical fibers and the substrate that are secured using the laser beam may experience elevated stress compared with the other portions of the optical fibers and the substrate. To maintain the high precision placement provided by the laser beam while minimizing high stress concentrations at connector interfaces, the present disclosure discussed a method of forming a fiber array that involves cutting the fiber array to separate weld zones from the operative coupling surfaces of the optical fibers, as described in more detail below.

As used herein, the term "melt" means that a material is modified by heating in any manner that bonds an optical fiber to a substrate, and includes, but is not limiting to, actual melting of the substrate material as well as visco-elastic swelling of the substrate material.

Figure 2:
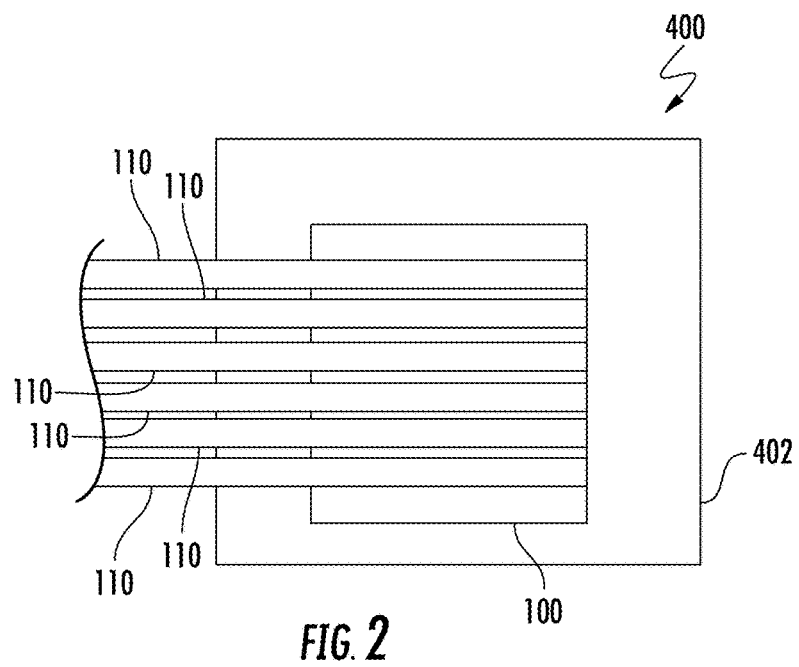
FIG. 2 schematically depicts a connector having an assembly comprising a plurality of optical fibers bonded to a substrate by a laser welding process according to one or more embodiments described and illustrated herein.

Referring now to FIG. 1, a partial perspective view of a substrate 100 with a plurality of optical fibers 110 bonded thereto is schematically depicted. As an example and not a limitation, the substrate 100 and the plurality of optical fibers 110 may be incorporated into a fiber optic connector, as illustrated schematically in FIG. 2. For example, the optical fiber connector 400 of FIG. 2 may include a housing 402 and the substrate 100 and at least a portion of the optical fibers 110 may be located in the housing 402. It should be understood that embodiments described herein are not limited to fiber optic connectors. The optical fiber and substrate assemblies may be incorporated into other optical devices.

Referring again to FIG. 1, the example substrate 100 comprises a first surface 102 (also referred to herein as an upper surface), a second surface 104 opposite the first surface 102 and at least one edge 106 extending between the first surface 102 and the second surface 104. In some embodiments, the substrate 100 may be made of a low melting temperature material capable of migrating into, around, or into and around the material of the optical fiber 110. Generally, the melting temperature of the substrate 100 should be lower than the melting temperature of the optical fibers 110. An example non-limiting material for the optical fibers 110 is fused silica. Example materials for the substrate 100 include, but are not limited to, glass, silica, glass ceramics, ceramics such as alumina or zirconia-based ceramics, Yttrium-Stabilized Zirconia, crystals such as sapphire, and silicon. Non-limiting glass materials include alkaline earth boro-aluminosilicate glass (e.g., as manufactured and sold under the trade name Eagle XG® by Corning Incorporated of Corning, N.Y.) and alkali-aluminosilicate glass (e.g., as manufactured and sold by Corning Incorporated of Corning, N.Y. under the trade name Gorilla® Glass). Other examples include Pyrex® and Borofloat. As non-limiting examples, the softening point for Eagle XG® is about 970 C. Other non-limiting examples of glass include BK7 glass, soda lime, and other glasses with flat or polished surfaces. For such glasses, the softening point may be within a range of about 650 C to about 800 C, including endpoints. The softening point for fused silica is about 1715 C, so any glass with softening point less than 1500-1600 C may be acceptable. It should be understood that the substrate 100 may be made of other materials and the material of the substrate 100 is not limited by this disclosure. The thickness T of the substrate 100 is also not limited by this disclosure. The thickness T of the substrate 100 may be any thickness as desired for the end-application of the optical fiber 110 and substrate 100 assembly.

The plurality of optical fibers 110 are bonded to the first surface 102 of the substrate 100 by one or more laser bonding (also referred to herein as laser welding) processes as described in detail below. If needed, the optical fibers 110 are stripped of any jacket (see e.g., jacket 248 in FIG. 12) or outer layers prior to bonding to the substrate 100. Although FIG. 1 depicts four optical fibers 110, it should be understood that any number of optical fibers 110 may be bonded to the surface 102 of the substrate 100 (i.e., one or more optical fibers 110). It should also be understood that the optical fibers 110 may be bonded to the second surface 104, or both the first surface 102 and the second surface 104 of the substrate 100.

The optical fibers 110 may be fabricated from any material having a higher melting temperature than that of the substrate 100. As noted above, the optical fibers 110 may be fabricated from fused silica. In the embodiment illustrated in FIGS. 3 and 4, the optical fibers 110 have a round shape in cross section. However, the optical fibers 110 may be elliptical in shape or have any other suitable shape. As described in more detail below, the optical fibers 110 may have at least one curved surface that focus a laser beam to a focused diameter such that a size (e.g., a diameter) of the laser beam at the contact area 113 (FIG. 3) between the optical fiber 110 and the first surface 102 of the substrate 100 is smaller than a size of the initial diameter of the laser beam as it enters the optical fiber 100. While circular cross-section fibers are discussed herein, fibers having other cross-sectional shapes may be used, such as, for example, square or rectangular cross-section fibers. When fibers without a curved surface are in use (e.g., square or rectangular cross-section fibers), the laser source may include or utilize a lens to focus the laser beam.

Each optical fiber 110 is bonded to the first surface 102 of the substrate 100 at one or more laser bond areas 112 (also called a bond area, an additional bond area, a first laser bond area, a second laser bond area) along the length of the optical fiber 110. It is noted that the laser bond areas 112 are denoted by ellipses in FIG. 1. As described in detail below, the laser bond areas 112 are regions of the first surface 102 of the substrate 100 where the optical fiber 110 contacts the first surface 102 of the substrate 100 and the material of the substrate 100 is laser-melted (i.e., melting caused by a laser beam) and secured to the optical fiber 110, for example, by diffusing into the material of the optical fiber 110, forming around the optical fiber 110, or both diffusing into the material of the optical fiber 110 and forming around the optical fiber 110. The laser bond areas 112, which includes laser-melted material caused by the application of a laser beam, bond (also referred to herein as welding) the optical fiber 110 to the first surface 102. It is noted that, in some embodiments, heating of a contact area 113 (FIG. 3 between optical fiber 110 and the first surface 102 of the substrate 100 may be provided by application of electromagnetic energy (e.g., microwaves) rather than a laser beam.

Referring again to FIG. 1, any number of laser bond areas 112 may be provided along the length of the optical fiber 110. For example, in the embodiment illustrated in FIG. 1 each optical fiber 110 has three laser bond areas 112 securing each fiber 110 to the substrate 104. A group of closely arranged laser bond areas 112 is referred to herein as a laser bond zone. Thus, in some embodiments a single row 204 of laser bond areas 112 that are spaced from other laser bond areas 112 (or a single row 204 of laser bond areas 112 that are the only laser bond areas 112 for the optical fibers 110) may be referred to as a laser bond zone 202. In other embodiments, such as the embodiment illustrated in FIG. 1, two or more rows 204 of laser bond areas 112 that are in close proximity form a laser bond zone 202. Thus, as used herein, the term laser bond zone 202 may include a single laser bond area 112 or a plurality of laser bond areas 112 that are in close proximity to each other.

Figure 3:
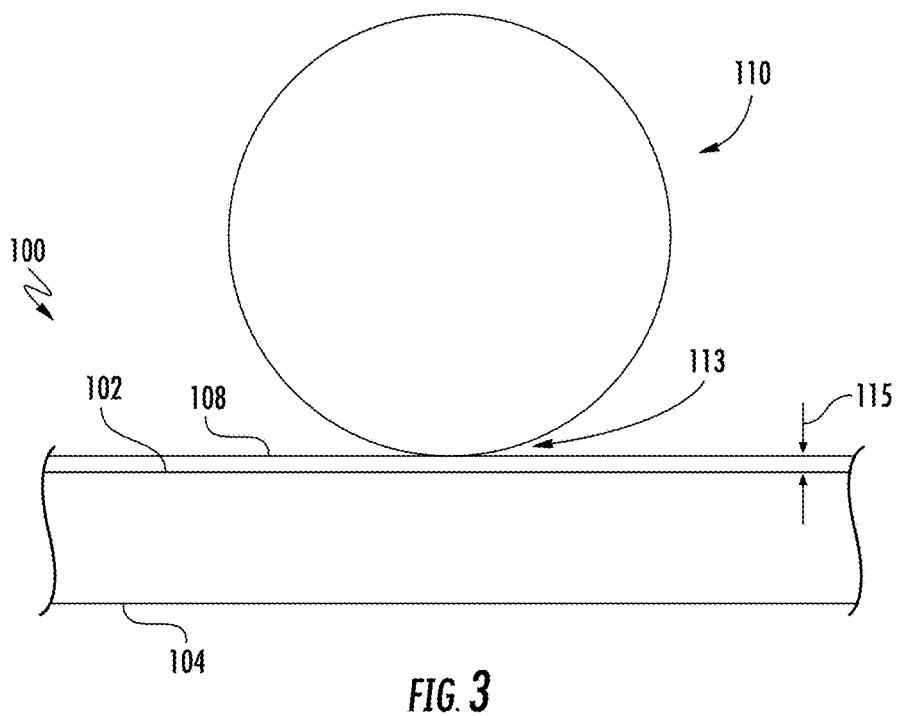
FIG. 3 schematically depicts an end view of an optical fiber positioned on a film layer disposed on a surface of a substrate according to one or more embodiments described and illustrated herein.

Referring now to FIGS. 3-6, an example process for laser welding optical fibers 110 to a substrate 100 is schematically illustrated. Referring first to FIG. 3, an end view of an optical fiber 110 disposed on a substrate 100 is schematically depicted. A film layer 108 is deposited on the first surface 102 (also called the upper surface). In other embodiments, the optical fiber 110 may be secured to the substrate 100 using a film layer 108 on a different surface of the substrate 100, such as the second surface 104. The film layer 108 is configured to absorb a wavelength of the laser beam, and raise the temperature of the first surface 102 to locally heat and melt the substrate 100, as described in more detail below and illustrated in FIGS. 4 and 5. The material of the film layer 108 should be chosen such that it is absorptive to the wavelength of the laser beam. As a non-limiting example, the film layer 108 may have an absorbance of greater than or equal to 10% as measured by reflectance and transmission of the sample. The absorbance is calculated as 100% minus the transmission value minus the reflectance value. In some embodiments, the substrate 100 is absorptive to a wavelength of the laser beam and may include doped or undoped silicon, glass, glass ceramic, crystals, or other materials.

The thickness 115 of the film layer 108 is not limited by this disclosure. It is noted that the thickness 115 of the film layer 108 is exaggerated in FIGS. 3 and 5 for illustrative purposes. As a non-limiting example, the thickness 115 of the film layer 108 may be less than or equal to 1 μm. In other embodiments, the thickness 115 of the film layer 108 may be less than or equal to about 1.5 μm. Non-limiting materials for the film layer 108 include metals (e.g., stainless steel), glasses (e.g., low melting glass (LMG)), ZnO, $TiO_2$, $Nb_2O_5$), an electromagnetic-absorbing oxide material, and an electromagnetic-absorbing nitride material, among others. The material and thickness of the film layer 108 should be such that the material of the substrate 100 at the first surface 102 melts due to the absorption of the laser beam by the film layer 108.

Still referring to FIG. 3, an optical fiber 110 is disposed on the film layer 108 such that a contact area 113 is defined by contact between the optical fiber 110 and the film layer 108. The contact area 113 generally extends along the length of the optical fiber 110 that it is in contact with the film layer 108. It is noted that, in some embodiments, no film layer 108 is provided and the optical fiber(s) 110 is disposed directly on the first surface 102 (and/or second surface 104) of the substrate 100.

Figure 4:
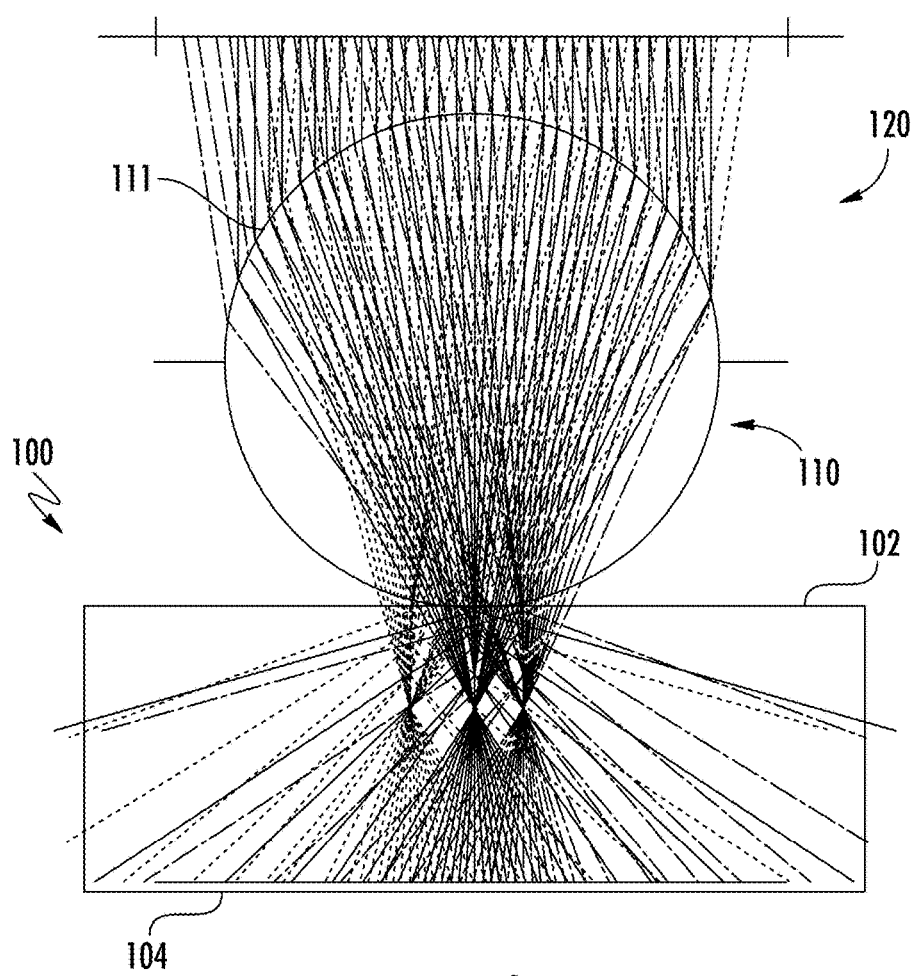
FIG. 4 schematically depicts ray tracing of light of a laser beam focused by the optical fiber depicted by FIG. 2 according to one or more embodiments described and illustrated herein.

In the embodiment illustrated in FIG. 3, the optical fiber 110 has a curved surface and has a generally circular cross-sectional shape. In other embodiments, the optical fiber 110 may have other cross-sectional shapes. The shape of the optical fiber 110 enables the optical fiber 110 to act as a cylindrical lens that focuses an incident laser beam 120 at the contact area 113 without a complicated optical delivery system. Referring now to FIG. 4, the example optical fiber 110 of FIG. 3 is shown having a laser beam 120 passing therethrough. The incident laser beam 120 is weakly focused as it enters the optical fiber 110. The curved upper surface 111 of the optical fiber 110 that receives the laser beam 120 focuses the laser beam 120 to a focused diameter at the contact area 113 that is smaller than a size (e.g., diameter) of the initial diameter of the laser beam 120 as the laser beam 120 enters the optical fiber 110 (i.e., at the upper surface 111 of the optical fiber 110). It is noted that the different line types depicting the ray-tracing of the laser beam 120 correspond to different input angles of the coherent laser beam due to the numerical aperture of the focusing lens (not shown). Thus, FIG. 4 schematically depicts how the optical fiber 110 acts as a cylindrical lens that focuses the laser beam, thereby reducing the size of the laser beam at the contact area 113 without the need for complicated optics. The reduction in size of the laser beam causes the film layer 108 (FIG. 3) to be heated quickly and provide the formation of a bond area 112 (FIG. 5) proximate the contact area 113 (FIG. 3). In some embodiments, an astigmatic beam profile is used to increase the size of the laser bond areas 112 along the fiber axis OA.

The properties of the laser beam 120 may be such that the laser beam melts the material of the substrate 100 at the contact area 113 (FIG. 3) to form a thermal-type bond, thereby causing diffusion between the material of the optical fiber 110 and the material of the substrate 100. The laser beam may be a continuous wave (CW), quasi CW laser beam (i.e., a pulsed laser beam having a high repetition rate, for example, of greater than about 10 kHz), or other type of laser beam. The wavelength of the laser beam 120 may be such that the laser beam 120 is absorbed by the film layer 108 to melt the material of the substrate 100. For example, the wavelength of the laser beam 120 may be in the visible, ultraviolet, or near infrared spectral bands. As a non-limiting example, the wavelength of the laser beam 120 may be within a range of about 0.3 µm to about 1.7 µm, including endpoints. A single laser beam 120 may be used or multiple laser beams may be used to secure the optical fiber 110 (or optical fibers 110) to the substrate 100.

In some embodiments, a single mode laser source is used to generate the laser beam 120 and the laser beam 120 may be in a range of about 0.5 W to about 10 W including endpoints, and be single mode for focusing by the optical fiber 110. The initial diameter of the laser beam 120 at the upper surface 111 of the optical fiber 110 should be equal to or less than the diameter of the optical fiber 110. In some embodiments, for example, the initial diameter of the laser beam is between about 80 µm and about 400 µm, including endpoints. The duration of time that the laser beam 120 is focused by the optical fiber 110 should be long enough to melt the material of the substrate 100 and to form a bond between the optical fiber 110 and the substrate 100. In some embodiments, the focal point of the laser beam is on the surface 102 of the substrate 100.

As noted above, in some embodiments, no film layer is utilized to absorb the laser beam and the optical fibers 110 are secured to the substrate 100 using a non-thermal type bonding. In some embodiments, an ultrafast laser (i.e., a laser having a pulse duration of between about 20 fs and 100 ps) is used without an absorbing film layer 108. In other embodiments, the laser has a pulse duration of less than about 50 ps. The laser melts the material of the substrate 100 without a need for the absorbing film layer 108. Due to the material non-linearity and multiphoton absorption process, absorption occurs without an absorbing film. Non-limiting example power values of an ultrafast pulsed laser include a power density more than about 0.5 GW/cm$^2$ with an average power of greater than about 200 mW.

Figure 5:
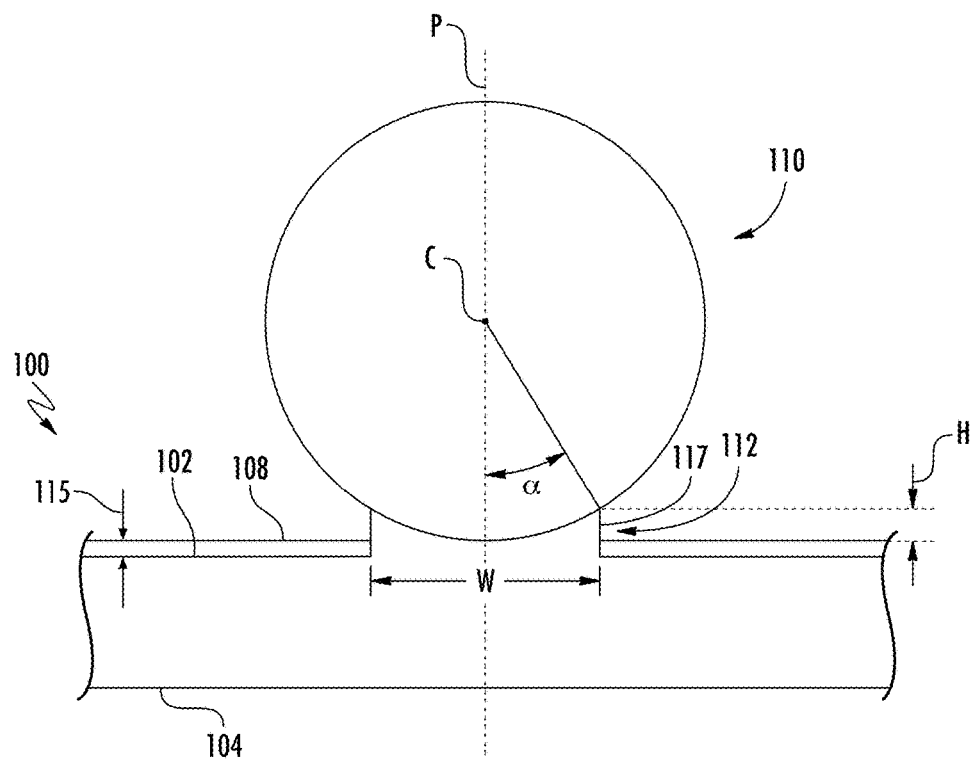
FIG. 5 schematically depicts the optical fiber of FIG. 2 bonded to the substrate using a laser beam according to one or more embodiments described and illustrated herein.

FIG. 5 schematically depicts an example embodiment of the optical fiber 110 after it is laser welded to the first surface 102 of the substrate 100 by the laser beam 120 (FIG. 4). Particularly, FIG. 5 depicts the topography of a bond area 112 that bonds the optical fiber 110 to the substrate 100. The film layer 108 absorbs a wavelength of the laser beam 120 (FIG. 4), which creates heat that causes the material of the substrate 100 to melt at the contact area 113 (FIG. 3). The melted material of the substrate 100 may diffuse into the optical fiber 110, and may also flow toward the optical fiber 110, thereby forming a laser bond area 112 having a height H as measured from the surface of the film layer 108 (or the first surface 102 of the substrate 100 in embodiments in which a film layer 108 is not used) to an edge 117 of the laser bond area 112 that contacts the optical fiber 110. The height H of the laser bond area 112 is not limited by this disclosure. As an example and not a limitation, the height H of the laser bond area 112 may be about 0.2 µm to about 10 µm including end points.

The width W of the laser bond area 112 is dependent on the diameter of the laser beam 120 (FIG. 4) after the laser beam 120 is focused by the optical fiber 110 (also called the focused diameter of the laser beam). Additionally, an angle α is defined between a plane P through a center C of the optical fiber 110 and an edge 117 of the laser bond area 112 (FIG. 5). The value of the angle α depends on the height H and the diameter of the optical fiber 110. As a non-limiting example, for a range of the height H may be from about 0.2 µm to about 10 µm and a range of optical fiber diameter from about 80 µm to 400 µm, the range of a is from about 2.6 degrees to about 40 degrees.

As shown in FIG. 5, the laser bond area 112 is a region of expanded glass that creates a recess matching the shape of the optical fiber 110 and providing significant contact area with the optical fiber 110. This contact area increases the bonding strength of the optical fiber 110 to the first surface 102 of the substrate 100.

Figure 6:
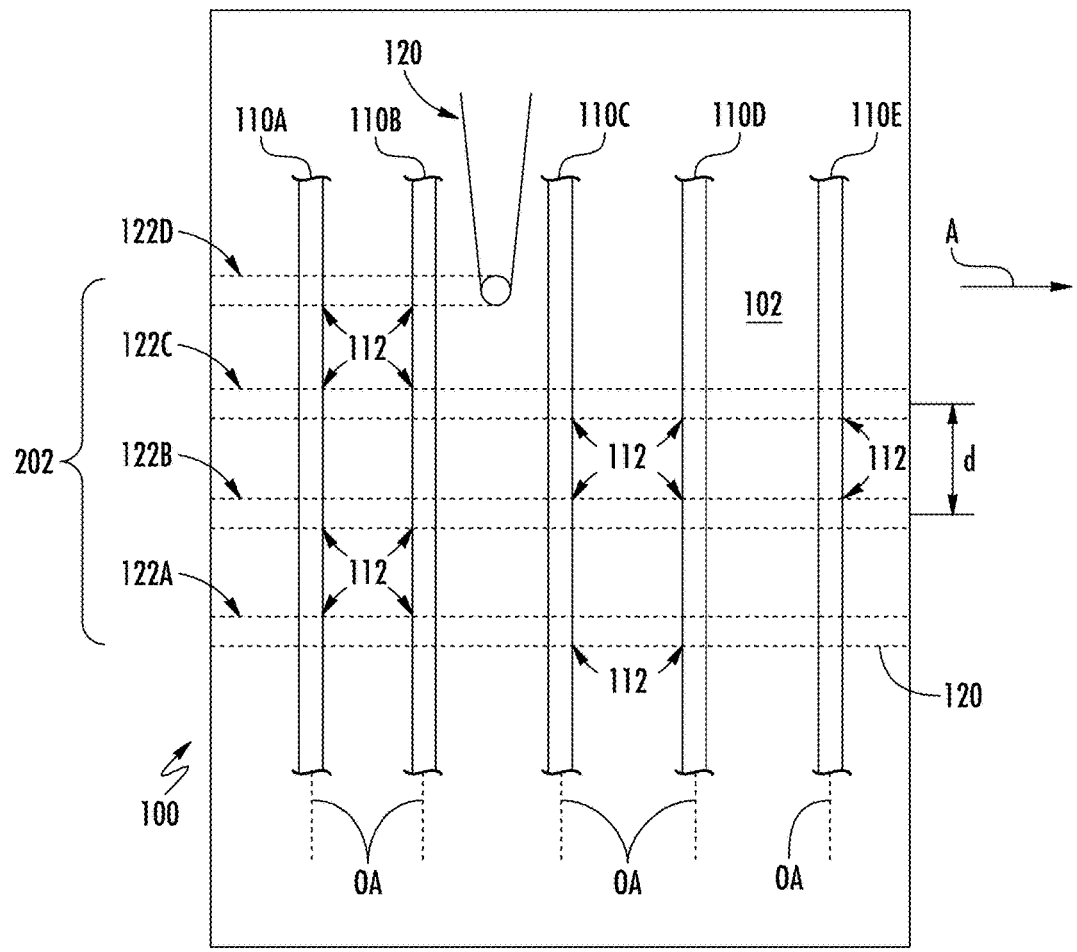
FIG. 6 schematically depicts a top down view of a plurality of optical fibers being bonded to a substrate by a plurality of passes of a laser beam according to one or more embodiments described and illustrated herein.

Multiple optical fibers 110 may be welded to the first surface 102 (and/or the second surface 104) of the substrate 100. FIG. 6 schematically depicts a top-down view of optical fibers 110A-110E disposed on a first surface 102 of a substrate 100. The optical fibers 110A-110E are placed on the first surface 102 of the substrate 100. The laser beam 120 or substrate 100 is then moved (or translated) in a first direction (e.g., direction A) that is transverse (i.e., extending across but not necessarily perpendicular) a longitudinal axis OA of the optical fibers 110A-110E such that the laser beam passes over the optical fibers 110A-110E to form bond areas 112 and the laser bond zone 202. In the example of FIG. 6, the direction A of the laser beam 120 is perpendicular to the longitudinal axis OA of the optical fibers 110A-110E. However, embodiments are not limited thereto. For example, the laser beam 120 (or the substrate 100) may be translated such that the direction A of the laser beam 120 is at a different angle to the OA of the optical fibers 110A-110E. It is noted that the laser beam 120 may be translated relative to the substrate 100, the substrate 100 may be translated relative to the laser beam 120, or both the laser beam 120 and the substrate 100 may be translated.

The laser beam 120 sequentially traverses and bonds (also referred to herein as welding) multiple optical fibers 110A-110E as it travels along direction A in a first pass 122A. As the laser beam 120 enters an optical fiber 110A-110E, it is focused as described above and creates a bond area 112. In some embodiments the material of the substrate 100 outside of the contact areas between the optical fibers 110A-110E and the substrate 100 is not melted by the laser beam 120. Rather, material is only melted at the contact areas (e.g., contact area 113 as shown in FIG. 3) because of the focusing effect of the optical fibers 110A-110E on the laser beam 120. In other embodiments, only those portions of the substrate 100 that are to be bonded to the optical fibers 110A-110E have a film layer 108.

As shown in FIG. 6, multiple passes 122A. 122B. 122C, 122D of the laser beam 120 may be performed to weld the optical fibers 110A, 110B, 110C, 110D, 110E to the substrate 100 at multiple bond areas 112 along the length of the optical fibers 110A, 110B, 110C, 110D, 110E. Together, the bond areas 112 form a bond zone 202. For example, a position of the laser beam 120 or the substrate 100 may be shifted by a distance d in a direction parallel to the longitudinal axis OA of the optical fibers 110A-110E after completion of a pass (e.g., the first pass 122A) to translate in a second direction to perform a subsequent pass (e.g., the second pass 122B) that may also be transverse to the longitudinal axis A of the optical fibers 11A-110E. The distance d may depend on the desired number of bond areas 112 in the laser bond zone 202. After shifting the position of the laser beam 120 or the substrate 100, the laser beam 120 or the substrate 110 is again translated traverse to the longitudinal axis OA of the optical fibers 110A-110E. In FIG. 6, a fourth pass 122D is not yet complete as the laser beam 120 approaches a third optical fiber 110C. As a non-limiting example, the translation speed of the laser beam 120 with respect to the substrate 100 is in the range of about 5 mm/s to about 200 mm/s, including endpoints, and in some embodiments up to about 1 m/s.

Figure 7:
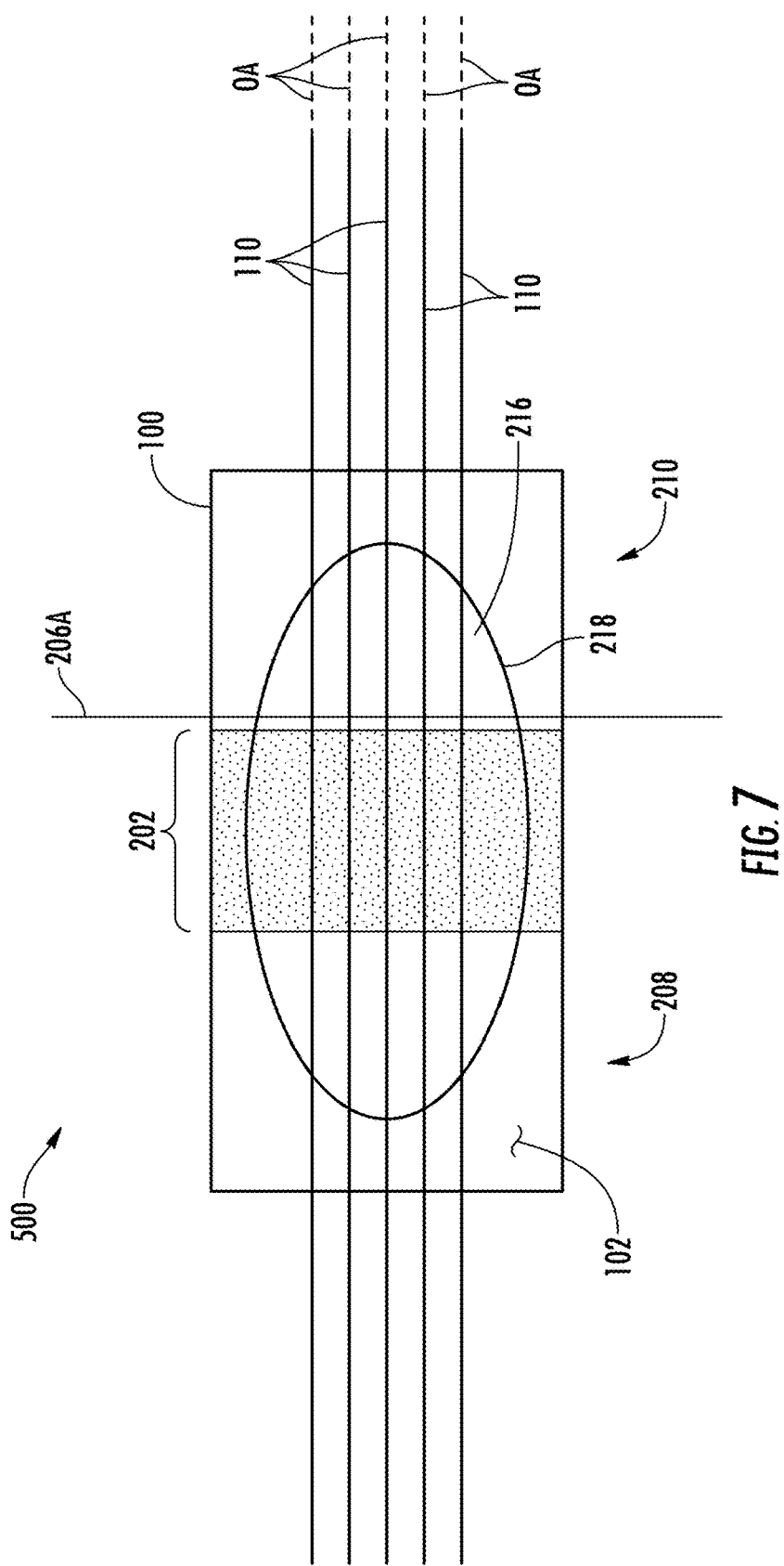
FIG. 7 schematically depicts a top down view of a fiber array having a plurality of optical fibers bonded to a substrate and a cutting line between a first section of the fiber array and a second section of the fiber array according to one or more embodiments described and illustrated herein.

FIG. 7 schematically depicts a top down view of a fiber array 500 having a plurality of optical fibers 110 bonded to a substrate 100 and a cutting line 206A between a first section 208 of the fiber array 500 and a second section 210 of the fiber array 500. As discussed above, securing the optical fibers 110 to the substrate 100 using laser beams can provide a high precision placement and securing of the optical fibers 110 to the substrate 100 without the use of traditional V-groove alignment. However, using a laser beam to secure optical fibers 110 to the substrate 100 may cause the portions of the optical fibers 110 and the substrate 100 that are secured using the laser beam to experience elevated stress compared with the other portions of the optical fibers 110 and the substrate 100. To maintain the high precision placement provided by the laser beam while providing operative coupling surfaces (e.g., cut ends 214 (FIG. 8) of the optical fibers 110) without high stress caused by the laser beam, the fiber array 500 is cut to separate the laser bond zone 202 from the operative optical coupling surfaces (also called cut ends 214 of the optical fibers 110). In practice, one or more optical fibers 110 are placed on the first surface 102 of the substrate 100 as described above. The optical fibers 110 may be placed directly on the first surface 102 of the substrate 100 or on a film layer 108 (FIG. 3) over the substrate 100, as described above. A laser beam 120 (see e.g., FIGS. 4 and 6) is directed into each of the optical fibers 110 disposed on the first surface 102 of the substrate 100, as described above. The laser beam 120 may be translated in a first direction (see e.g., the direction A in FIG. 6) transverse to a longitudinal axis OA of the plurality of optical fibers 110 such that the laser beam passes over the plurality of optical fibers 110 to form a laser bond area (see e.g., laser bond areas 112 in FIG. 1) between each of the plurality of optical fibers 110 and the first surface 102 of the substrate 100. In other embodiments, the substrate 100 is translated such that the laser beam passes over the plurality of optical fibers 110 to form the laser bond areas 112 between each of the plurality of optical fibers 110 and the first surface 102 of the substrate 100. The group of laser bond areas 112 forms the laser bond zone 202.

An adhesive 216 is also applied to the optical fibers 110 and the first surface 102 of the substrate 100 to create an adhesive bond zone 218 between the optical fibers 110 and the first surface 102 of the substrate 100. The adhesive 216 may be any suitable type of bonding agent, such as, but not limited to, a UV curable epoxy, a thero-curable epoxy, or a two-part epoxy. As illustrated in FIG. 7, the adhesive bond zone 218 may overlap with the laser bond zone 202 and may also extend beyond the laser bond zone 202. In the embodiment illustrated in FIG. 7, the adhesive bond zone 218 covers part but not all of the first surface 102 of the substrate 100. In other embodiments, the adhesive bond zone 218 may cover more or less of the substrate 100 than what is illustrated in FIG. 7. The optical fibers 110 are held in place on the substrate 100 by both the laser bond areas 112 in the laser bond zone 202 and the adhesive 216 in the adhesive bond zone 218.

FIG. 7 illustrates a cutting line 206A, which is a graphical representation of the location at which the optical fibers 110 and the substrate 100 are to be cut. The cutting operation may involve one or more of dicing, laser cutting, and scoring the optical fibers 110 and the substrate 100. In other embodiments, the cutting operation may involve other methods or operations for cutting the optical fibers 110 and the substrate 100.

Figure 8:
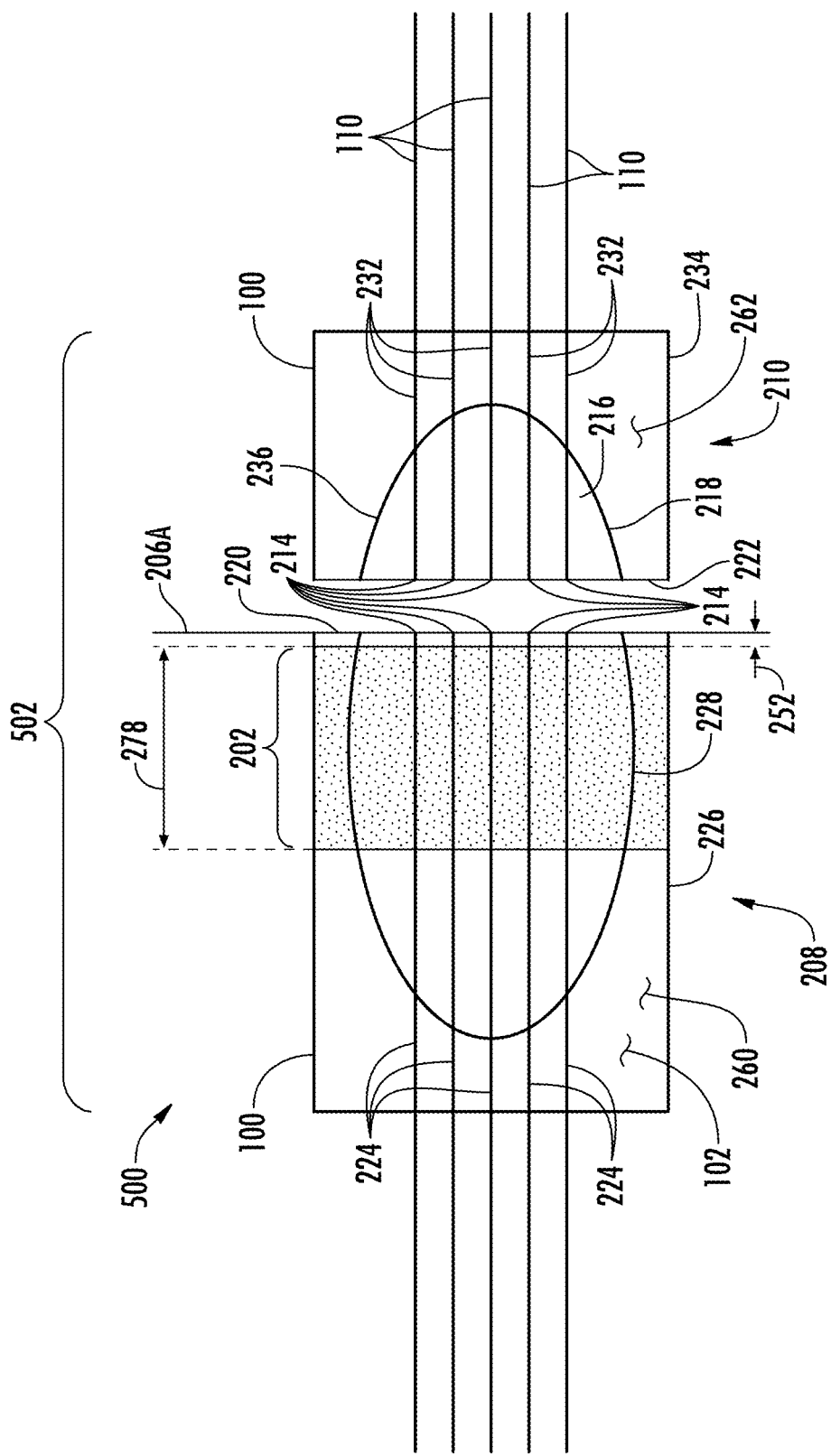
FIG. 8 schematically depicts a top down view of the fiber array of FIG. 7 in which the first section of the fiber array is separated from the second section of the fiber array according to one or more embodiments described and illustrated herein.

FIG. 8 schematically depicts a top down view of the fiber array 500 of FIG. 7 in which the optical fibers 110 and the substrate 100 have been cut along the cutting line 206A to form a first section 208 of the fiber array 500 and a second section 210 of the fiber array 500. Once cut, the first section 208 of the fiber array 500 and the second section 210 of the fiber array 500 each have a cut edge 220, 222. The cut edge 220 of the first section 208, the cut edge 222 of the second section 210, or both cut edges 220, 222 of the first and second sections 208, 210 of the fiber array 500 may be used to form an operative fiber optic coupling surface of an optical device such as an optical connector (see e.g., the fiber optical connector 400 illustrated in FIG. 2). The cut ends 214 of each of the optical fibers 110 of the first section 208 and the second section 210 may be polished or receive other processing steps.

While both the first and second sections 208, 210 of the fiber array 500 may be used to form optical devices, in some embodiments only one of the sections 208, 210 is used to form an optical device and the other section 208, 210 is not used (e.g., discarded). For example, in some embodiments only the second section 210 is used in an optical device, such as an optical connector, and the first section 208 is not used and may be discarded. Whether or not to use a section 208, 210 of the fiber array 500 may depend on the requirements of the end use. For example, some end uses may require that the section 208, 210 of the fiber array 500 does not include any part of the laser bond zone 202. In such uses, only the second section 210 may be used for the optical device but the first section 208 may not be used for the optical device because first section 208 includes the laser bond zone 202. In other uses, a section 208, 210 of the fiber array 500 may be used as long as the laser bond zone 202 is spaced from the cutting line 206A (i.e., spaced from the cut ends 214 of the optical fibers 110). In such applications, both the first and second sections 208, 210 may be used for the application as long as a distance 252 between the cut ends 214 of the optical fibers 110 in the second section 210 are sufficiently spaced from the laser bond zone 202.

As illustrated in FIG. 8, the first section 208 of the fiber array 500 includes a first portion 224 of each of the plurality of optical fibers 110, a first portion 226 of the substrate 100, a first portion 230 of the adhesive bond zone 218, and the laser bond zone 202. The second section 210 of the fiber array 500 includes a second portion 232 of each of the plurality of optical fibers 110, a second portion 234 of the substrate 100, and a second portion 236 of the adhesive bond zone 218. As noted above, the portion of the optical fibers 110 and the substrate 100 in the laser bond zone 202 may experience higher stress than the other portions of the optical fibers 110 and the substrate 100. Stress experienced by the optical fibers 110 and the substrate 100 in the laser bond zone 202 dissipates as a function of the distance from the laser bond zone 202. However as noted above, the laser bond zone 202 provides high accuracy placement of the optical fibers 110. By cutting the fiber array 500 outside of the laser bond zone 202 (i.e., by locating the cutting line 2016A outside of the laser bond zone 202) and then using the second section 210 of the fiber array 500 to form a fiber optic device, the fiber optic device does not include the laser bond zone 202 and the distance between the laser bond zone 202 in the cutting line 206A is sufficient such that the stress caused by the laser bond zone 202 does not adversely impact the second portions 232 of the optical fibers 110.

For example, in some embodiments a single mode laser source (not shown) is used to generate a laser beam having an optical power within a range of about 2 W to about 10 W. and an initial diameter of the laser beam is between about 1 µm and about 400 µm. In such embodiments, the cutting line 206A is located at a distance 252 between about 0 µm and about 4 mm from the first laser bond zone 202. In other embodiments, the cutting line 206A is at a distance between about 200 µm and about 4 mm from the first laser bond zone 202. In yet other embodiments, the cutting line 206A is at a distance between about 200 µm and about 1 mm from the first laser bond zone 202. It has been found that these distances from the laser bond zone 202 are sufficient such that the second portion 232 of the optical fibers 110 experiences acceptable amounts of stress from the laser welding process. However, at this distance the optical fibers 110 are still held in high precision alignment by the laser bond zone 202. Thus, the second section 210 of the fiber array 500 has the benefit of the precise alignment caused by the fiber welding without higher stress experienced in the laser bond zone 202.

Figure 9:
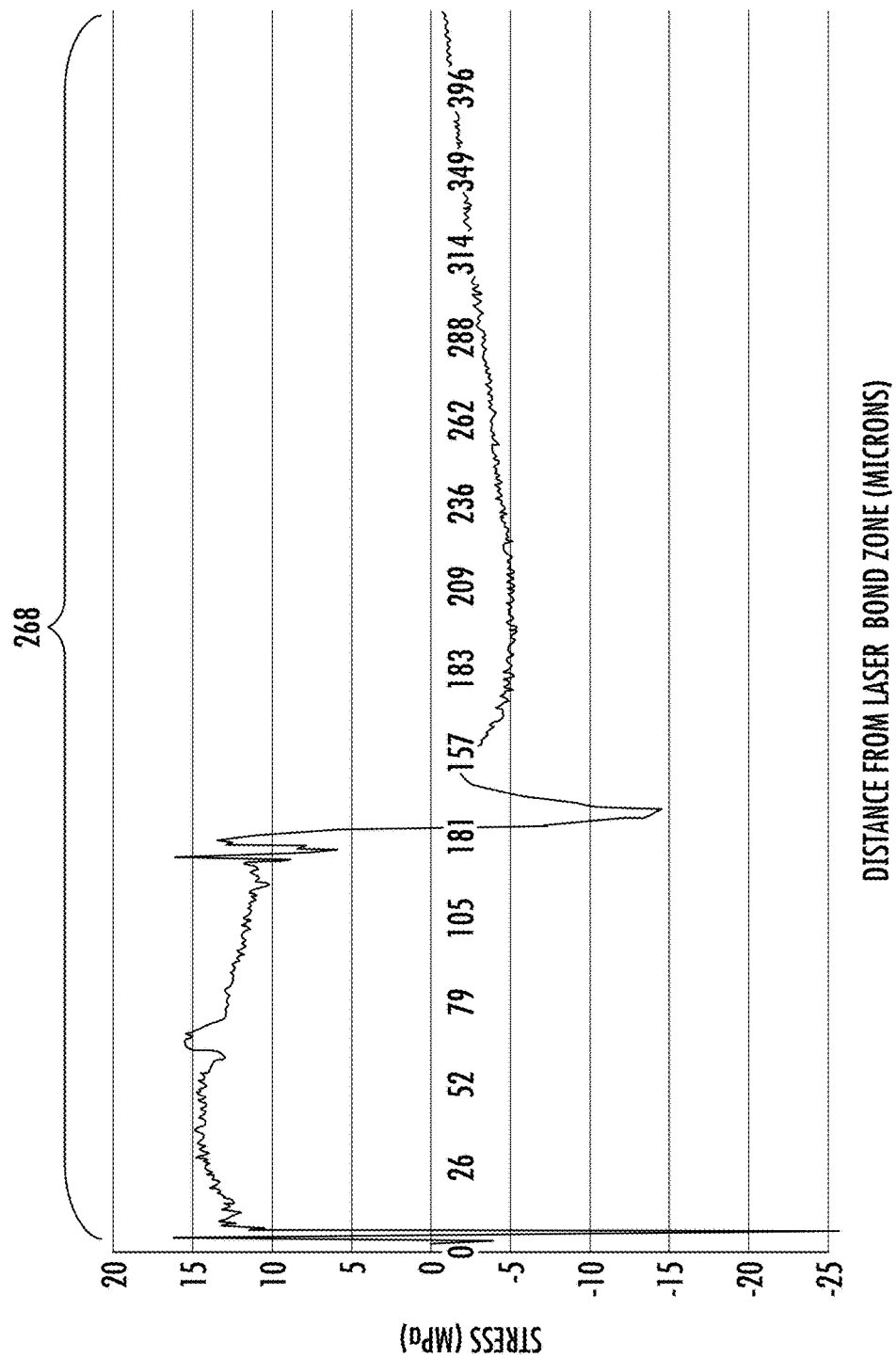
FIG. 9 is a plot illustrating the residual stress fields in an optical fiber and a substrate bonded together using one or more of the embodiments described and illustrated herein.

FIG. 9 illustrates a plot showing tensile and compressive stress of an optical fiber 110 and substrate 100 that have been bonded using a laser beam having an optical power of about 2-5 W, and an initial diameter of the laser beam is less than about 150% of the fiber diameter. In the plot, compression (also called compressive stress) in the optical fiber 110 and substrate 100 is shown in megapascals (MPa) as the positive values on the y-axis, tension (also called tensile stress) in the optical fiber 110 is shown in megapascals (MPa) as the negative values on the y-axis, and distance from the laser bond zone 202 is shown in microns on the x-axis. As shown in the plot, the stress dissipates as a function of the distance along the optical fiber 110 from the laser bond zone 202. In some embodiments, the length of the optical fiber 110 and substrate 100 that experience stress (either tensile stress or compressive stress) outside of specified values is considered to be the stress region 268. In the embodiment illustrated in FIG. 9, for example, the stress region 268 of the optical fiber 110 and the substrate 100 extends a distance of approximately 400 microns from the laser bond zone 202 at which point the tensile stress is less than about −1 MPa. In other embodiments, the stress region may be defined as the length of the optical fiber 110 and the substrate 100) to the point at which the tensile stress or compressive stress is below a different value. For example, in some embodiments the stress region is defined as the length of the optical fiber 110 and the substrate 100 to the point at which the tensile stress is less than about −5 MPa, the tensile stress is less than about −4 MPa, the tensile stress is less than about −3 MPa, or the tensile stress is less than about −2 MPa. In other embodiments, the stress region may be defined as the length of the optical fiber 110 and the substrate 100 to the point at which the compressive stress is below a specified value. In some embodiments, for example, the stress region is defined as the length of the optical fiber 110 and the substrate 100 to the point at which the compressive stress is less than about 1 MPa or at or about neutral (i.e., zero MPa). As used herein, the term "less than" a particular stress amount means stress levels that are closer to neutral stress or zero stress. Thus, for example, tensile stress that is less than about −4 MPa includes stress values between −4 MPa and neutral (zero MPa) including −3 MPa, −2 MPa, −1 MPa. As used herein, neutral stress includes stress that is within +/−0.5 MPa. In some embodiments, the cutting line 206A is at a location outside of a stress region 268 of the optical fibers 110. Thus, in the embodiment illustrated in FIG. 9, the cutting line 206A would be located at a distance equal to or greater than 400 microns from the laser bond zone 202. Depending on the type of laser used, the material of the substrate 100, the material of the optical fibers 110, and other factors, the stress region 268 of the optical fibers 110 may be slightly different. However, by locating the cutting line 206A outside of the stress region 268 the optical fibers 110, the second portions 232 of the optical fibers 110 on the second section 210 of the fiber optic array 500 experience little to no stress from the laser bond zone 202 while still being held high precision alignment by the laser bond zone 202.

In some embodiments, the first laser bond zone 202 comprises a first laser bond zone width (see e.g., the laser bond zone width 278 in FIG. 8), and the cutting line 206A may be located at a distance 252 from the first laser bond zone 202 that is equal to or greater than the first laser bond zone width 278. It has been found that the first laser bond zone width 278 can provide a sufficient distance from the laser bond zone 202 at which the stress from the laser bond zone 202 on the optical fiber 110 is acceptable. Thus, by locating the cutting line 206A at a distance that is equal to or greater than the first laser bond zone with 278, the second section 210 the fiber array 500 includes second portions 232 of the optical fibers 110 that experience little to no stress from the laser bond zone 202 and are still held in precise alignment by the laser bond zone 202.

Once the cutting is completed, the resulting apparatus 502 includes a substrate 100 comprising a first portion 226 having a first surface 260 and a second portion 234 having a second surface 262. The first portion 226 includes a first portion 224 of each optical fiber 110 secured to the first surface 260 at one or more laser bond areas 112 (e.g., laser bond zone 202) and a first portion 228 of the adhesive bond zone 218, wherein the first portion 228 of the adhesive bond zone 218 overlaps the laser bond zone 202. The second portion 234 includes a second portion 232 of the optical fibers 110 secured to the second surface 262 at a second portion 236 of the adhesive bond zone 218, wherein the second portion 232 of the optical fibers 110 comprises a polished end 214.

Figure 10:
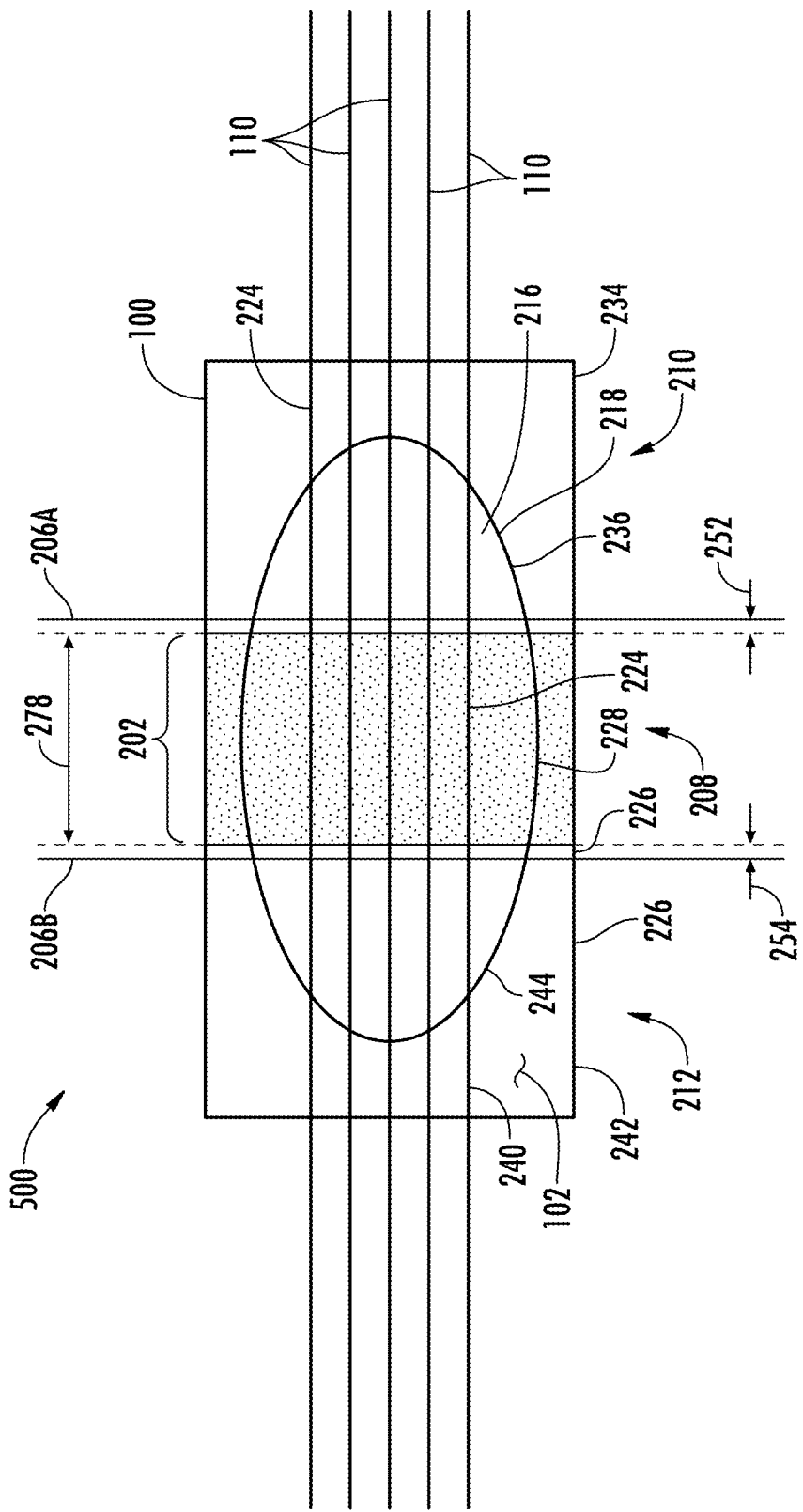
FIG. 10 schematically depicts a top down view of the fiber array of FIG. 7 having a first cutting line and a second cutting line according to one or more embodiments described and illustrated herein.

FIG. 10 schematically depicts a top down view of the fiber array of FIG. 7 having an additional, second cutting line 206B. In practice, the fiber array 50X) may be cut at the first cutting line 206A and the second cutting line 206B to create first, second, and third sections 208, 210, 212 of the fiber array 500. The first section 208 includes the first portion 224 of the optical fibers 110, a first portion 226 of the substrate 100, a first portion 228 of the adhesive bond zone 218, and the first laser bond zone 202. The second section 210 includes the second portion 224 of the optical fibers 110, the second portion 234 of the substrate 100, and the second portion 236 of the adhesive bond zone 218. Finally, the third section 212 includes a third portion 240 of the optical fibers, a third portion 242 of the substrate 100, and a third portion 244 of the adhesive bond zone 218. In the embodiment of FIG. 9, third section 212 of the fiber array 500 does not include the first laser bond 202.

The first and second cutting lines 206A, 206B may each be located specified distances 252, 254 from the laser bonding zone 202. For example, in some embodiments a single mode laser source is used to generate the laser beam and the laser beam has an optical power within a range of about 2 W to about 10 W, and an initial diameter of the laser beam is between about 80 µm and about 400 µm. In such embodiments, the first and second cutting lines 206A, 206B are each located at distances 252, 254 between about 0 µm and about 4 mm from the first laser bond zone 202, between about 200 µm and about 4 mm from the first laser bond zone 202, or between about 200 µm and about 1 mm from the first laser bond zone. It has been found that these distances from the laser bond zone 202 are sufficient such that the second and third portions 232, 240 of the optical fibers 110 experiences little to no stress from the laser bonding process. However, the second and third portions 232, 240 of the optical fibers 110 are still held in high precision alignment by the laser bond zone 202.

As noted above, the cutting lines 206A, 206B may also each be located outside of a stress region 268 (FIG. 9) of the optical fibers 110 in some embodiments. Depending on the type of laser used, the material of the substrate 100, the material of the optical fibers 110, and other factors, the stress region 268 of the optical fibers 110 may be slightly different. By locating the cutting line 206As outside of the stress region 268 the optical fibers 110, the second and third portions 232, 240 of the optical fibers 110 experience little to no stress from the laser bonding process.

In other embodiments, the cutting lines 206A, 206B may be located at distances 252, 254 from the laser bond zone 202 that are equal to or greater than the first laser bond zone width 278.

Figure 11:
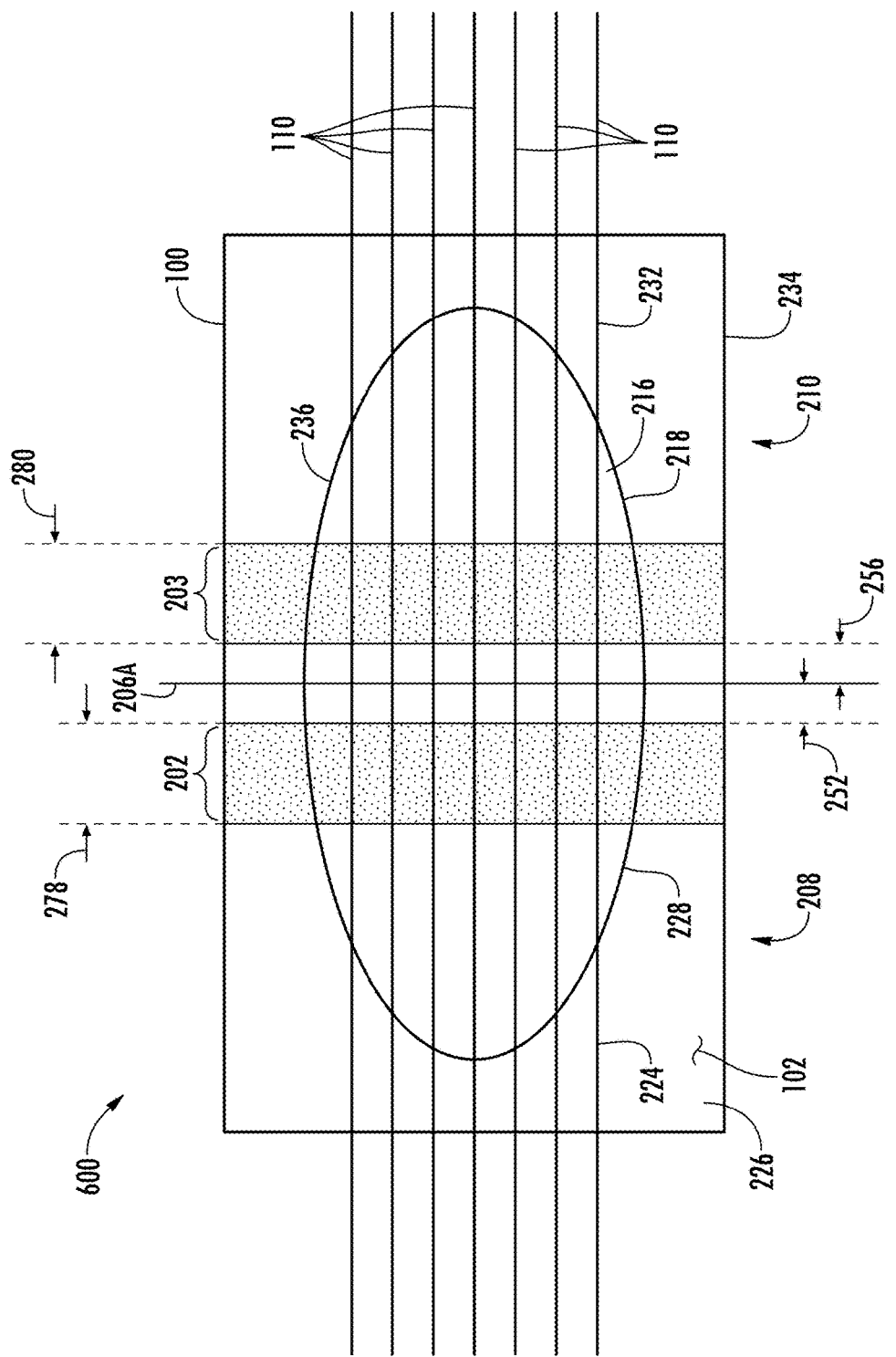
FIG. 11 schematically depicts a top down view of another example of a fiber array having a plurality of optical fibers bonded to a substrate and a cutting line between a first section of the fiber array and a second section of the fiber array according to one or more embodiments described and illustrated herein.

FIG. 11 schematically depicts a top down view of another example of a fiber array 600 having a plurality of optical fibers 110 bonded to a substrate 100 and a cutting line 206A between a first section 208 of the fiber array 600 and a second section 210 of the fiber array 600. However, the fiber array of FIG. 11 includes two laser bond zones; a first laser bond zone 202 and a second laser bond zone 203. The second laser bond zone 203 may be created using the same laser beam or laser beams as were used to create the first laser bond zone 202 or a different laser beam or laser beams (e.g., a second laser beam). To create the second laser bond zone 203, the laser beam (or a second laser beam) is directed into the plurality of optical fibers 110 disposed on the first surface 102 of the substrate 100 at second, different location than the first laser bond zone 202. As described above, the second laser beam melts the material of the substrate 100) to create the second laser bond areas (not illustrated in FIG. 11) between each of the plurality of optical fibers 110 and the first surface 102 of the substrate 100. The group of second laser bond areas forms a second laser bond zone 203.

FIG. 1 illustrates a cutting line 206A between the first and second laser bond zones 202, 203. Once cut, the cut edges of both the first section 208 and the second section 210 may each be processed (e.g., by polishing the cut ends (see e.g., cut ends 214 in FIG. 8) of the optical fibers 110) or receive other processing steps in order for both sections 208, 210 to be used in optical devices such as optical connectors. While both the first and second sections 208, 210 of the fiber array 600 may be used to form optical connectors, in some embodiments only one of the sections 208, 210 is used to form an optical connector (or used for some other purpose in an optical application) and the other section is not used (e.g., discarded).

As illustrated in FIG. 11, the first section 208 of the fiber array includes a first portion 224 of each of the plurality of optical fibers 110, a first portion 226 of the substrate 100, a first portion 228 of the adhesive bond zone 218, and the first laser bond zone 202. The second section 210 of the fiber array 600 includes a second portion 232 of each of the plurality of optical fibers 110, a second portion 234 of the substrate 100, a second portion 236 of the adhesive bond zone 218, and the second laser bond zone 203. By cutting the fiber array 600 outside of both of the laser bond zones 202, 203, the cut ends (see e.g., the cut ends 214 in FIG. 8) of the optical fibers 110 of the first and second sections 208, 210 need not include stress caused by the laser bond zones 202, 203 but may still be held in precise alignment by the laser bond zones 202, 203.

In some embodiments, a single mode laser source is used to generate the laser beam to form the laser bond zones 202, 203 and the laser beam has an optical power within a range of about 2 W to about 10 W, and an initial diameter of the laser beam is between about 80 µm and about 400 µm. In such embodiments, the cutting line 206A is located at distances 252, 256 between about 0 µm and about 4 mm from the first and second laser bond zones 202, 203, between about 200 µm and about 4 mm from the first and second laser bond zones 202, 203, or between about 200 µm and about 1 mm from the first and second laser bond zones 202, 203. In other embodiments, the cut line is at a location outside of a stress region (see, e.g., the stress region 268 illustrated in FIG. 9) of the optical fibers 110. In yet other embodiments, the first laser bond zone 202 comprises a first laser bond zone width 278, the second laser bond zone 203 comprises a second laser bond zone width 280, and the cutting line 206A is located at distances 252, 256 from the laser bond zones 202, 203 that are equal to or greater than the first laser bond zone width 278 and the second laser bond zone width 280, respectively. In other embodiments, the substrate 100 is cut about midway between the first laser bond zone 202 and the second laser bond zone 203.

Figure 12:
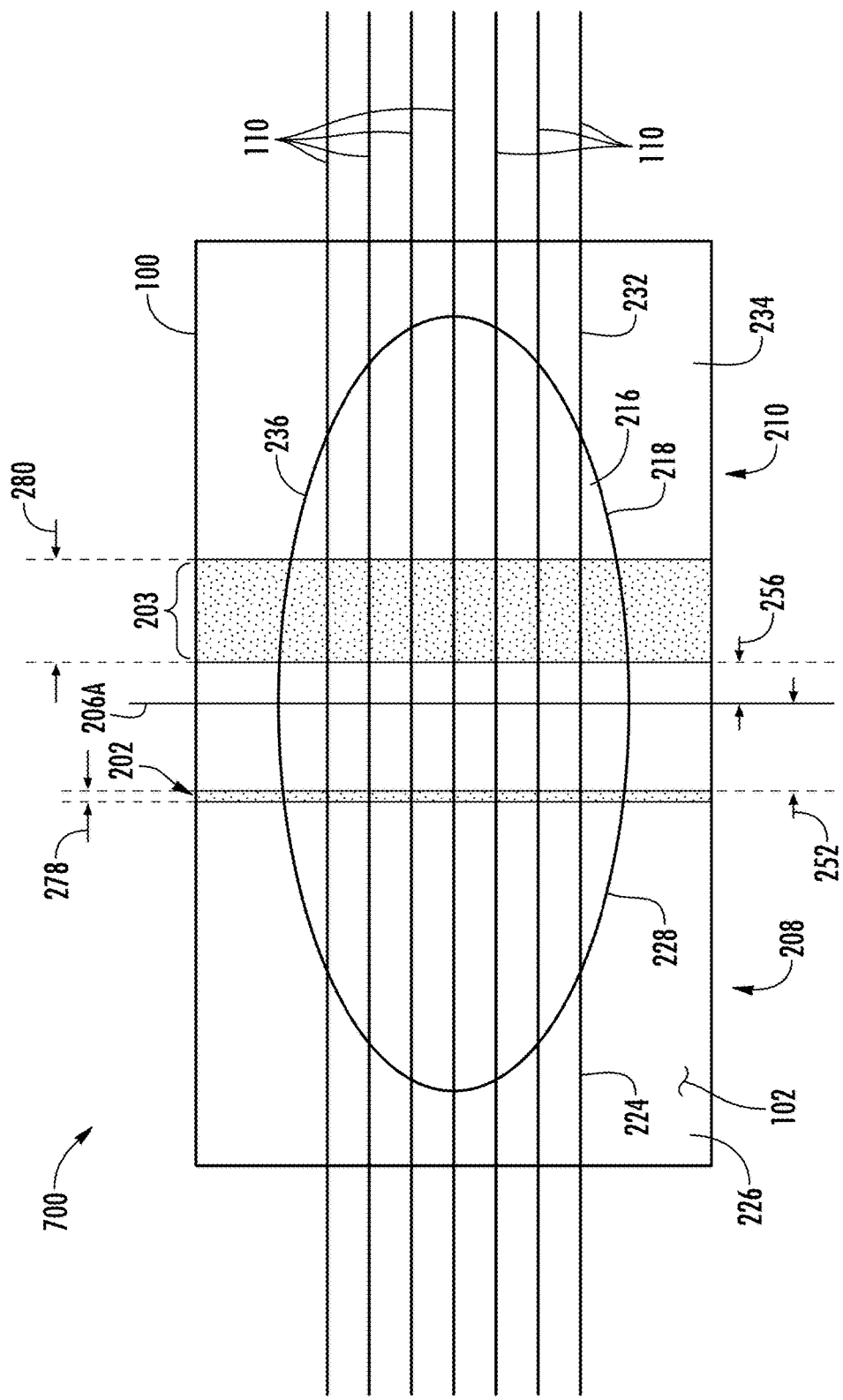
FIG. 12 schematically depicts a top down view of yet another example of a fiber array having a plurality of optical fibers bonded to a substrate and a cutting line between a first section of the fiber array and a second section of the fiber array according to one or more embodiments described and illustrated herein.

FIG. 12 schematically depicts a top down view of yet another example of a fiber array 700 having a plurality of optical fibers 110 bonded to a substrate 100 and a cutting line 206A between a first section 208 of the fiber array 700 and a second section 210 of the fiber array 700. The fiber array 700 of FIG. 12 includes two laser bond zones 202, 203 wherein the first laser bond zone 202 has a smaller bond zone width 278 than the bond zone width 280 of the second laser bond zone 203. The second laser bond zone 203 may be created using the same laser beam as the laser beam used to create the first laser bond zone 202 or a different laser beam (e.g., a second laser beam). To create the second laser bond zone 203, the laser beam (or a second laser beam) is directed into the plurality of optical fibers 110 disposed on the first surface 102 of the substrate 100 at second, different location than the first laser bond zone 202. As described above, the second laser beam melts the material of the substrate 100 to create the second laser bond areas (not illustrated in FIG. 12) between each of the plurality of optical fibers 110 and the first surface 102 of the substrate 100. The group of laser bond areas forms a second laser bond zone 203.

FIG. 12 illustrates a cutting line 206A between the first and second laser bond zones 202, 203. Once cut, the cut edges of both the first section 208 and the second section 210 may each be processed (e.g., by polishing the cut ends (see e.g., cut ends 214 in FIG. 8) of the optical fibers 110) or receive other processing steps in order for both sections 208, 210 to be used in optical devices such as optical connectors. While both the first and second sections 208, 210 of the fiber array 600 may be used to form optical connectors, in some embodiments only one of the sections 208, 210 is used to form an optical connector (or used for some other purpose in an optical application) and the other section is not used (e.g., discarded).

As illustrated in FIG. 12, the first section 208 of the fiber array includes a first portion 224 of each of the plurality of optical fibers 110, a first portion 226 of the substrate 100, a first portion 228 of the adhesive bond zone 218, and the first laser bond zone 202. The second section 210 of the fiber array 600 includes a second portion 232 of each of the plurality of optical fibers 110, a second portion 234 of the substrate 100, a second portion 236 of the adhesive bond zone 218, and the second laser bond zone 203. By cutting the fiber array 600 outside of both of the laser bond zones 202, 203, the cut ends (see e.g., the cut ends 214 in FIG. 8) of the optical fibers 110 of the first and second sections 208, 210 need not include stress caused by the laser bond zones 202, 203 but may still be held in precise alignment by the laser bond zones 202, 203.

In some embodiments, a single mode laser source is used to generate the laser beam to form the laser bond zones 202, 203 and the laser beam has an optical power within a range of about 2 W to about 10 W, and an initial diameter of the laser beam is between about 80 µm and about 400 µm. In such embodiments, the cutting line 206A is located at distances 252, 256 between about 0 µm and about 4 mm from the first and second laser bond zones 202, 203, between about 200 µm and about 4 mm from the first and second laser bond zones 202, 203, or between about 200 µm and about 1 mm from the first and second laser bond zones 202, 203. In other embodiments, the cut line is at a location outside of a stress region (see, e.g., the stress region 268 illustrated in FIG. 9) of the optical fibers 110. In yet other embodiments, the first laser bond zone 202 comprises a first laser bond zone width 278, the second laser bond zone 203 comprises a second laser bond zone width 280, and the cutting line 206A is located at distances 252, 256 from the laser bond zones 202, 203 that are equal to or greater than the first laser bond zone width 278 and the second laser bond zone width 280, respectively. In other embodiments, the substrate 100 is cut about midway between the first laser bond zone 202 and the second laser bond zone 203.

Figure 13:
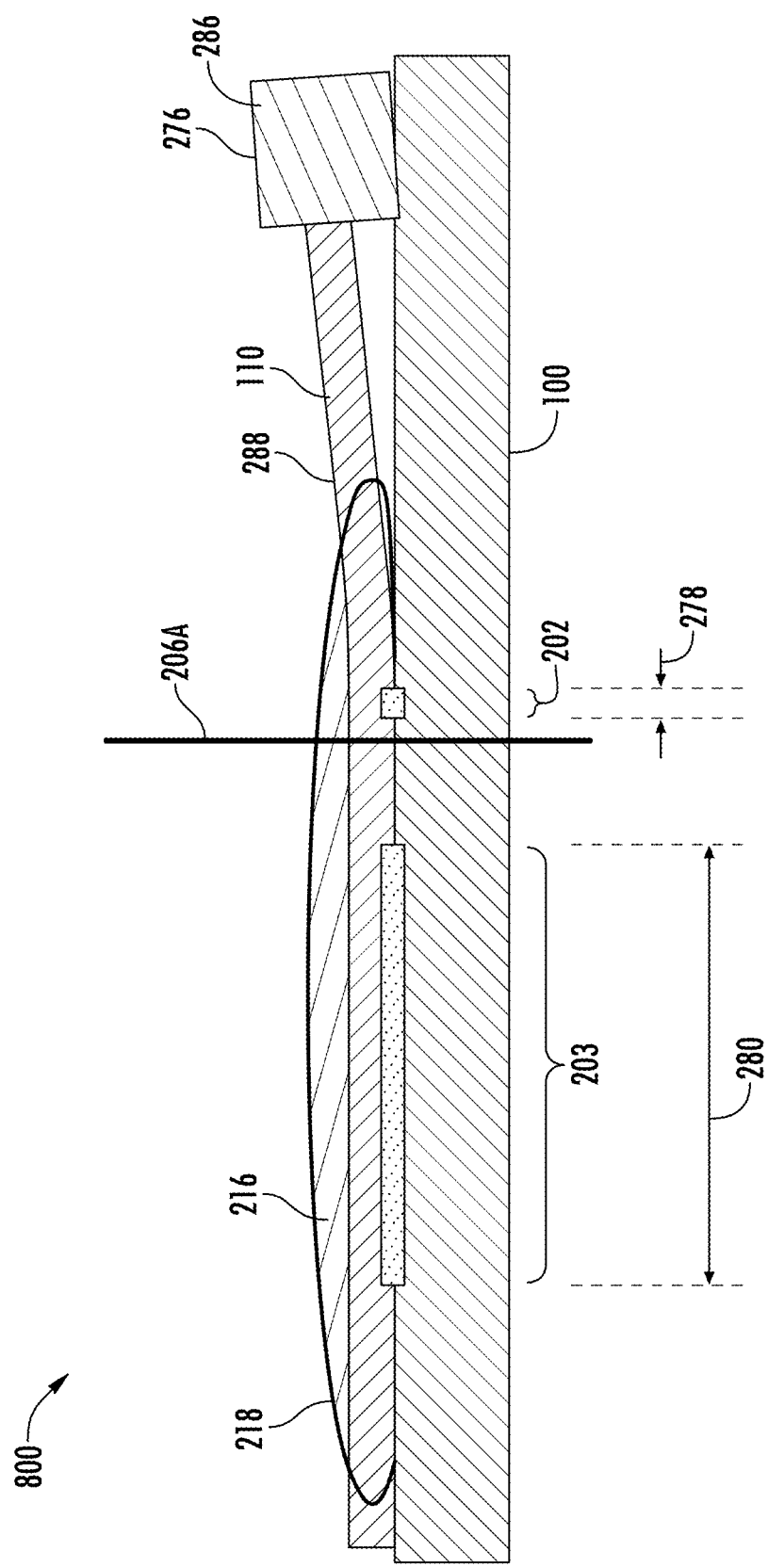
FIG. 13 schematically depicts a side elevation view of another example fiber array having a plurality of optical fibers bonded to a substrate and a cutting line between a first section of the fiber array and a second section of the fiber array according to one or more embodiments described and illustrated herein.

FIG. 13 schematically depicts a side elevation view of an example fiber array 800 having the configuration of the fiber array 700 illustrated in FIG. 11. As noted above, the fiber array 800 includes two laser bond zones 202, 203 wherein the first laser bond zone 101 has a smaller bond zone width 278 than the bond zone width 280 of the second laser bond zone 230. In the embodiment of FIG. 13, the adhesive bond zone 218 extends beyond both of the first and second laser bond zones 202, 203 and overlaps both of the first and second laser bond zones 202, 203. As illustrated in FIG. 13, the optical fibers 110 may include a coated portion 276 having a jacket 276 and an uncoated portion 288, and the uncoated portion 288 is secured to the substrate 100 at the laser bond zones 202, 203 by directing the laser beam into the uncoated portion of the optical fiber 110.

Figure 14:
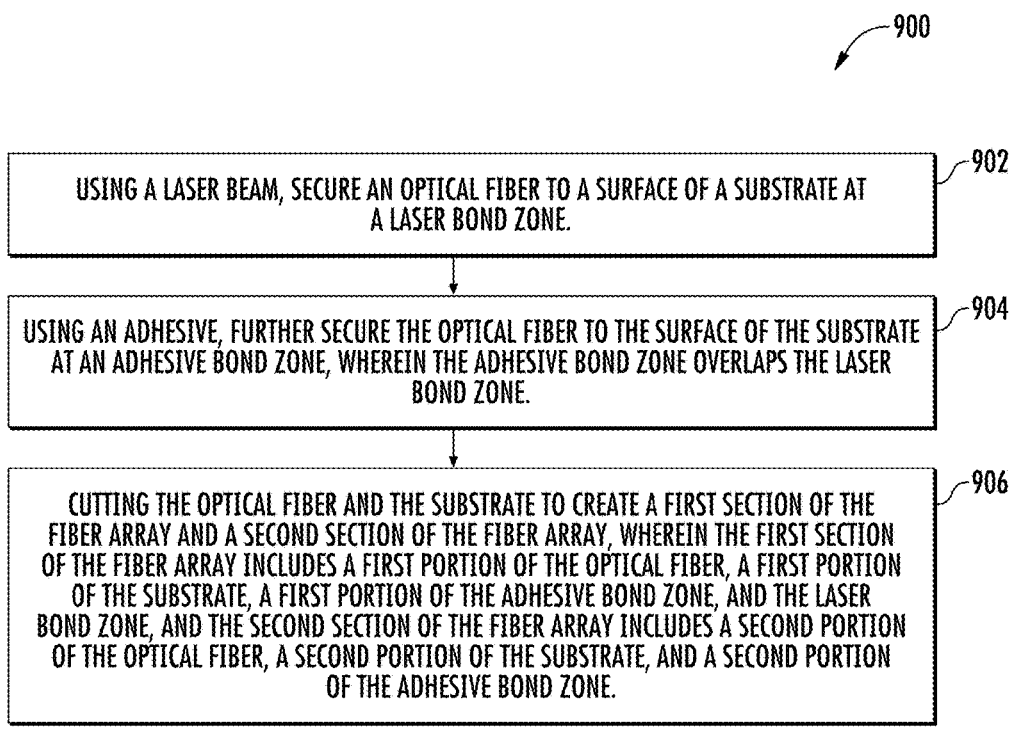
FIG. 14 schematically depicts a method of forming a fiber array according to one or more embodiments described and illustrated herein.

FIG. 14 schematically depicts a method 900 of forming a fiber array according to one or more embodiments described and illustrated herein. The method 900) includes using a laser beam to secure an optical fiber 110 to a surface 102 of a substrate 100 at a laser bond zone 202, as illustrated at block 902, and using an adhesive 216 to further secure the optical fiber 110 to the surface 102 of the substrate 100 at an adhesive bond zone 218, as illustrated at block 904. As noted above, the adhesive bond zone 218 may overlap the laser bond zone 202. The method 900 also includes cutting the optical fiber 110 and the substrate 100 to create a first section 208 of the fiber array 500 and a second section 210 of the fiber array 500, wherein the first section 208 of the fiber array 500 includes a first portion 224 of the optical fiber 110, a first portion 226 of the substrate 100, a first portion 228 of the adhesive bond zone, and the laser bond zone 202, and the second section 210 of the fiber array 500 includes a second portion 232 of the optical fiber 110, a second portion 234 of the substrate 10X), and a second portion 236 of the adhesive bond zone, as illustrated at block 906.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method of forming a fiber array, the method comprising:
  placing an optical fiber on a surface of a substrate;
  directing a laser beam into the optical fiber disposed on the surface of the substrate;

bonding, using the laser beam, a material of the substrate to the optical fiber to create a first laser bond zone between the optical fiber and the surface of the substrate;

applying an adhesive to the optical fiber and the substrate to create an adhesive bond zone between the optical fiber and the surface of the substrate; and cutting the optical fiber and the substrate to create a first section of the fiber array and a second section of the fiber array, wherein the first section of the fiber array comprises a first portion of the optical fiber, a first portion of the substrate, a first portion of the adhesive bond zone, and the first laser bond zone, and the second section of the fiber array comprises a second portion of the optical fiber, a second portion of the substrate, and a second portion of the adhesive bond zone.

2. The method of claim 1, wherein cutting the optical fiber and the substrate comprises one or more of dicing, laser cutting, and scoring the optical fiber and the substrate.

3. The method of claim 1, further comprising polishing a cut end of the second portion of the optical fiber.

4. The method of claim 1, wherein the second section of the fiber array does not include the first laser bond zone.

5. The method of claim 1, further comprising:
directing a second laser beam into the optical fiber disposed on the surface of the substrate; and
bonding, using the second laser beam, the material of the substrate to the optical fiber to create a second laser bond zone between the optical fiber and the surface of the substrate.

6. The method of claim 5, wherein the second section of the fiber array comprises the second laser bond zone.

7. The method of claim 6, wherein cutting the optical fiber and the substrate further comprises cutting the optical fiber and the substrate about midway between the first laser bond zone and the second laser bond zone.

8. The method of claim 1, further comprising utilizing a single mode laser source to generate the laser beam, wherein the laser beam has an optical power within a range of about 2 W to about 10 W, and an initial diameter of the laser beam is between about 80 µm and about 400 µm.

9. The method of claim 8, wherein cutting the optical fiber and the substrate further comprises cutting the optical fiber and the substrate at a distance between about 0 µm and about 4 mm from the first bond zone.

10. The method of claim 8, wherein cutting the optical fiber and the substrate further comprises cutting the optical fiber and the substrate at a distance between about 200 µm and about 4 mm from the first bond zone.

11. The method of claim 8, wherein cutting the optical fiber and the substrate further comprises cutting the optical fiber and the substrate at a distance between about 200 µm and about 1 mm from the first bond zone.

12. The method of claim 1, wherein cutting the optical fiber and the substrate further comprises cutting the optical fiber and the substrate at a location outside of a stress region of the optical fiber, wherein the stress region extends from the laser bond zone along the optical fiber to a distance at which the tensile stress in the optical fiber and the substrate is less than about −1 MPa.

13. The method of claim 1, wherein the first bond zone comprises a first laser bond width, and wherein cutting the optical fiber and the substrate further comprises cutting the optical fiber and the substrate at a distance from the first bond zone that is equal to or greater than the first laser bond width.

14. The method of claim 1, further comprising cutting the optical fiber and the substrate to create a third section of the fiber array, wherein the third section of the fiber array comprises a third portion of the optical fiber, a third portion of the substrate, and a third portion of the adhesive bond zone.

15. The method of claim 14, wherein the third section of the fiber array does not include the first laser bond zone.

16. The method of claim 1, wherein the optical fiber comprises a coated portion and an uncoated portion, and wherein directing the laser beam into the optical fiber further comprises directing the laser beam into the uncoated portion of the optical fiber.

17. The method of claim 1 wherein directing the laser beam into the optical fiber comprises translating the laser beam or the substrate such that the laser beam is directed into the optical fiber at a plurality of locations, wherein the plurality of locations define the first laser bond zone.

18. The method of claim 1, wherein the laser bond zone overlaps the adhesive bond zone.

19. A method of forming a fiber array, the method comprising:
placing a plurality of optical fibers on a surface of a substrate;
translating a laser beam or the substrate in a first direction transverse to longitudinal axes of the plurality of optical fibers such that the laser beam passes over the plurality of optical fibers to form a laser bond zone between the plurality of optical fibers and the surface of the substrate;
applying an adhesive to the plurality of optical fibers and the substrate to create adhesive bond zone between the plurality of optical fibers and the surface of the substrate; and
cutting the plurality of optical fibers and the substrate to create a first section of the fiber array and a second section of the fiber array, wherein the first section of the fiber array comprises a first portion of each of the plurality of optical fibers, a first portion of the substrate, a first portion of the adhesive bond zone, and the laser bond zone, and the second section of the fiber array comprises a second portion of each of the plurality of optical fibers, a second portion of the substrate, and a second portion of the adhesive bond zone.

20. The method of claim 19, further comprising polishing a cut end of the second portion of the plurality of optical fibers.

21. The method of claim 19, wherein the second section of the fiber array does not include the laser bond zone.

22. The method of claim 19, further comprising:
directing a second laser beam into the plurality of optical fibers disposed on the surface of the substrate; and
melting, using the second laser beam, the material of the substrate to create a second laser bond zone between the plurality of optical fibers and the surface of the substrate.

23. The method of claim 22, wherein the second section of the fiber array comprises the second laser bond zone.

24. The method of claim 22, wherein cutting the optical fiber and the substrate to create the first section of the fiber array and the second section of the fiber array further comprises cutting the optical fiber and the substrate at a location outside of a stress region of the plurality of optical fibers, wherein the stress region extends from the laser bond zone along the optical fiber to a distance at which the tensile stress in the substrate and the optical fiber is less than about −1 MPa.

25. The method of claim 22, wherein the first bond zone comprises a bond width, and wherein cutting the optical fiber and the substrate to create the first section of the fiber array and the second section of the fiber array further comprises cutting the plurality of optical fibers and the substrate at a distance from the first bond zone that is equal to or greater than the first bond width.

26. A method of forming a fiber array, the method comprising:
- using a laser beam, securing an optical fiber to a surface of a substrate to form a laser bond zone between the optical fiber and the surface of the substrate;
- using an adhesive, securing the optical fiber to the surface of the substrate to form an adhesive bond zone between the optical fiber and the surface of the substrate; and
- cutting the optical fiber and the substrate to create a first section of the fiber array and a second section of the fiber array, wherein the first section of the fiber array comprises a first portion of the optical fiber, a first portion of the substrate, a first portion of the adhesive bond zone, and the laser bond zone, and the second section of the fiber array comprises a second portion of the optical fiber, a second portion of the substrate, and a second portion of the adhesive bond zone.

* * * * *